(12) United States Patent
Behrens et al.

(10) Patent No.: US 8,091,835 B2
(45) Date of Patent: Jan. 10, 2012

(54) EXCHANGEABLE PROPELLANT CARTRIDGE SYSTEM

(75) Inventors: John W. Behrens, Torrance, CA (US); Frank O. Chandler, Huntington Beach, CA (US); Jeffrey J. Cronick, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 232 days.

(21) Appl. No.: 12/496,618

(22) Filed: Jul. 1, 2009

(65) Prior Publication Data
US 2010/0012788 A1    Jan. 21, 2010

Related U.S. Application Data

(62) Division of application No. 11/162,333, filed on Sep. 7, 2005, now Pat. No. 7,575,200.

(51) Int. Cl.
*B64G 1/00* (2006.01)
*B64G 1/64* (2006.01)

(52) U.S. Cl. .................. 244/172.3; 244/172.5

(58) Field of Classification Search ..... 244/172.2–172.5
See application file for complete search history.

(56) References Cited

U.S. PATENT DOCUMENTS

| | | | |
|---|---|---|---|
| 4,728,060 A | 3/1988 | Cohen | |
| 4,741,502 A | 5/1988 | Rosen | |
| 4,807,834 A | 2/1989 | Cohen | |
| 5,429,328 A | 7/1995 | Dobbs et al. | |
| 5,511,748 A | 4/1996 | Scott | |
| 6,149,104 A | 11/2000 | Soranno | |
| 6,193,193 B1 | 2/2001 | Soranno et al. | |
| 6,299,107 B1 | 10/2001 | Kong et al. | |
| 6,322,023 B1 | 11/2001 | Soranno et al. | |
| 6,484,973 B1 | 11/2002 | Scott | |
| 6,523,783 B2 | 2/2003 | Lounge et al. | |
| 6,669,148 B2 | 12/2003 | Anderman et al. | |
| 6,845,303 B1 | 1/2005 | Byler | |
| 7,070,151 B2 | 7/2006 | D'Ausilio et al. | |
| 7,114,682 B1 | 10/2006 | Kistler et al. | |
| 7,156,348 B1 | 1/2007 | Kistler et al. | |
| 7,370,834 B2 | 5/2008 | Scott | |
| 7,387,279 B2 | 6/2008 | Anderman et al. | |
| 2002/0130222 A1 | 9/2002 | Anderman | |
| 2002/0179775 A1 | 12/2002 | Turner | |
| 2003/0029969 A1 | 2/2003 | Turner | |
| 2006/0145024 A1 | 7/2006 | Kosmas | |

FOREIGN PATENT DOCUMENTS

WO    2004054877    7/2004

*Primary Examiner* — Tien Dinh
*Assistant Examiner* — Joseph W Sanderson
(74) *Attorney, Agent, or Firm* — Ostrager Chong Flaherty & Broitman P.C.

(57) ABSTRACT

A propellant depot (40, 150) includes a utility box (42, 42') that has space flight equipment. A propellant cartridge adaptor (95) is coupled to the utility box (42, 42') and to an exchangeable propellant cartridge system (41). The propellant depot (40, 150) also includes a docking adaptor (44) for coupling to an approaching spacecraft (24). A controller (66) controls the transfer of propellant from within the exchangeable propellant cartridge system (41) to the spacecraft (24). A method of providing propellant to a spacecraft in space includes launching an orbital propellant depot (40, 150) into space. The spacecraft is docked to the orbital propellant depot (40, 150) in space. Propellant is transferred to the spacecraft. The spacecraft is separated from the orbital propellant depot (40, 150).

11 Claims, 6 Drawing Sheets

EXCHANGEABLE PROPELLANT CARTRIDGE SYSTEM

CROSS REFERENCE TO RELATED APPLICATION

The present application is a divisional of U.S. application Ser. No. 11/162,333, filed Sep. 7, 2005, which is incorporated herein by reference.

TECHNICAL FIELD

The present description relates generally to spacecraft propellant replacement systems. More particularly, the present description is related to the replacement of propellant on a spacecraft, such as a lunar or non-earth surface activity module or a crew exploration vehicle.

BACKGROUND

Systems and devices used in space flight and exploration, such as non-earth surface activity modules and other spacecraft, are continuously being researched and developed for various purposes. Surface activity modules, such as a lunar surface activity module, are filled with propellant on earth and then launched into space to perform a predetermined mission. Upon completion of the mission, the modules are left in space or returned back to earth for analysis, parts, and/or for updating and reuse.

Current surface activity modules and spacecraft that require propellant to perform certain tasks, such as flight control, flight translation or orientation through use of thrusters, or other propellant requiring tasks, are performance limited and restricted due to the limited amount of propellant available onboard. As such, many spacecraft are incapable of performing extended missions or missions that require a substantial amount of propellant consumption over a short duration of time.

In addition, there are vehicle weight and size restrictions and limitations, as well as significant costs associated with the launching of a vehicle, which are directly related to the amount of propellant that the vehicle is caring onboard. The more propellant a vehicle is caring, generally, the heavier the vehicle, the larger the vehicle, and the more propellant required and the higher the costs associated with the launch of that vehicle. Moreover, there are overall limitations upon which the launching of such a vehicle becomes impractical or infeasible.

Thus, there exists a need for a propellant replacement technique that overcomes the stated restrictions and limitations and allows for extended and repeated flight explorations and the ability to perform flight missions that require a significant amount of propellant.

SUMMARY

One embodiment of the present description provides a propellant depot that includes a utility box with space flight equipment. A propellant cartridge adaptor is coupled to the utility box and to an exchangeable propellant cartridge system. The propellant depot also includes a docking adaptor for coupling to an approaching spacecraft. A controller controls the transfer of propellant from within the exchangeable propellant cartridge to the spacecraft.

Another embodiment of the present description provides an exchangeable propellant cartridge system for an orbital propellant depot. The cartridge system includes a propellant tank(s). An orbital propellant depot docking adaptor is coupled to the propellant tank(s). A thruster is coupled to the propellant tank(s). An avionics support system is coupled to the propellant tank(s) and to the thruster. The support system guides the cartridge system to mate with the orbital propellant depot.

Still another embodiment of the present description provides a method of providing propellant to a spacecraft in space. The method includes launching an orbital propellant depot into space. The spacecraft is docked to the orbital propellant depot in space. Propellant is transferred to the spacecraft. The spacecraft is separated from the orbital propellant depot.

The embodiments of the present description provide several advantages. One such advantage is the provision of an in space propellant depot. This allows for propellant resupply of a spacecraft in space for extended and repeated mission performance. This also allows for flight missions to be performed that require a significant amount of propellant consumption over short durations of time.

Furthermore, another advantage provided by an embodiment of the present description is the provision of a propellant depot that contains life support systems. This allows for supplying propellant to manned spacecraft.

Yet another advantage provided by an embodiment of the present description is the provision of an exchangeable propellant cartridge system for an in-space propellant depot. This allows an orbital propellant depot to remain in orbit while only replacing the propellant cartridges associated therewith.

The present description provides an efficient and inexpensive technique for supplying propellant to a spacecraft in space. The present description provides relatively low cost propellant tanks that are self-contained and may be replaceable or self-disposing.

The present description itself, together with further objects and attendant advantages, will be best understood by reference to the following detailed description, taken in conjunction with the accompanying drawing.

DETAILED DESCRIPTION

Figure 1:
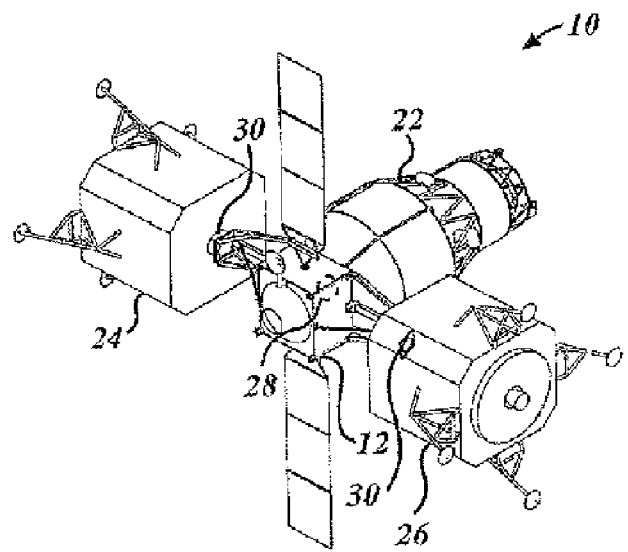
FIG. 1 is a perspective view of a terrestrial system incorporating an orbital propellant depot in accordance with an embodiment of the present description.
Figure 1:
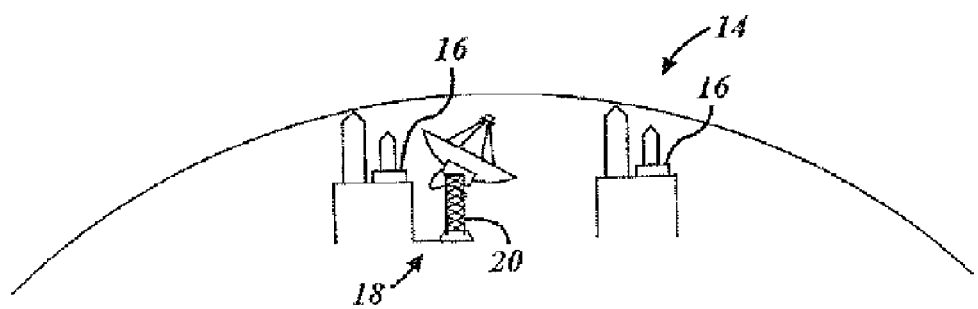

In order to support a space exploration program that includes multiple mission architecture, the associated spacecraft thereof must be supplied with propellant between missions or trips. For example, in order for a lunar surface activity module to perform multiple trips between a moon surface and an orbit around the moon or earth, the module needs to be resupplied with propellant. This propellant resupply may be performed at various locations, some of which including a lunar orbit, the earth-moon L1 node, an earth orbit, or elsewhere in space. The present description provides propellant resupply crafts that allow for the supplying of propellant to spacecraft at the stated locations, the propellant supply crafts and methods are described in greater detail below. Also, a variety of other embodiments are contemplated having different combinations of the below described features of the present description, having features other than those described herein, or even lacking one or more of those features. As such, it is understood that the apparatuses and methods described can be carried out in various other suitable modes.

In each of the following Figures, the same reference numerals are used to refer to the same components. While the present description is described with respect the propellant resupply of spacecraft, the present apparatuses and methods may be adapted for various applications and systems including: land-based vehicle systems, or other applications or systems known in the art that require servicing of a vehicle.

In the following description, various operating parameters and components are described for one constructed embodiment. These specific parameters and components are included as examples and are not meant to be limiting.

Referring now to FIG. 1, a perspective view of a terrestrial system incorporating an orbital propellant depot 10 in accordance with an embodiment of the present description is shown. The terrestrial system includes ground-based systems 14 and one or more orbital propellant depots, only one is shown, specifically the propellant depot 10. The ground-based systems 14 include launch platforms 16 for the orbital propellant depots, as well as for surface activity modules, crew exploration vehicles, exchangeable propellant cartridge systems, and other spacecraft, some of which are described below. The ground-based systems 14 may include a control or communication system 18 for communication control of the various spacecraft before, during, and after launching of the spacecraft. Of course, signals received from the ground-based systems 14 may be transmitted directly from the ground-based systems 14 or indirectly through various antenna, transponders, satellites, space stations, or other communication medium known in the art. A ground-based antenna tower 20 is shown.

The propellant depots 10, in general, are launched from earth to be placed in space and are used for supplying propellant to spacecraft in space. The propellant depots may also be used as a safe harbor for crewmembers, as will become more apparent in view of the following description. Spacecraft may dock to the propellant depots, refill their propellant tanks, and then continue performing mission tasks. The mission tasks may be performed in space, in an earth orbit, in a lunar orbit, on the moon, or elsewhere in space.

The propellant depots may orbit the earth, the moon, or other planetary or non-planetary bodies. In one example embodiment, the propellant depots are located at the L1 node or the point in space where gravity pull from the earth and the moon are approximately equal. At this node, the propellant depots 10 orbit the earth at the same rate as the moon.

The utility box 12 is coupled to an exchangeable propellant cartridge system 22 and to a first spacecraft and to a second spacecraft, which are represented by boxes 24 and 26, respectively. The spacecrafts 24 and 26 may be in the form of surface activity modules, crew exploration vehicles, and/or other spacecrafts known in the art. The utility box 12 is coupled to the cartridge system 22 via a propellant cartridge adaptor 28 and to the spacecrafts 24 and 26 via spacecraft adaptors 30. The spacecrafts 24 and 26 may dock to the propellant depot 10 for refueling or for performing other servicing needs.

Although the present description is primarily concerned with the propellant resupply of spacecraft, the propellant depots may be utilized and/or modified to supply various other services. Also, although the present description is primarily concerned with the docking of propellant cartridge systems containing spacecraft propellant, other systems may be docked containing other services, support fluids, and equipment.

In general, the more expensive, difficult to design and integrate hardware is located onboard the utility box 12. The low cost propellant tanks are self-contained and are located on the cartridge system 22. This reduces operating costs and propellant replacement costs associated with having an orbital propellant depot.

Figure 2:
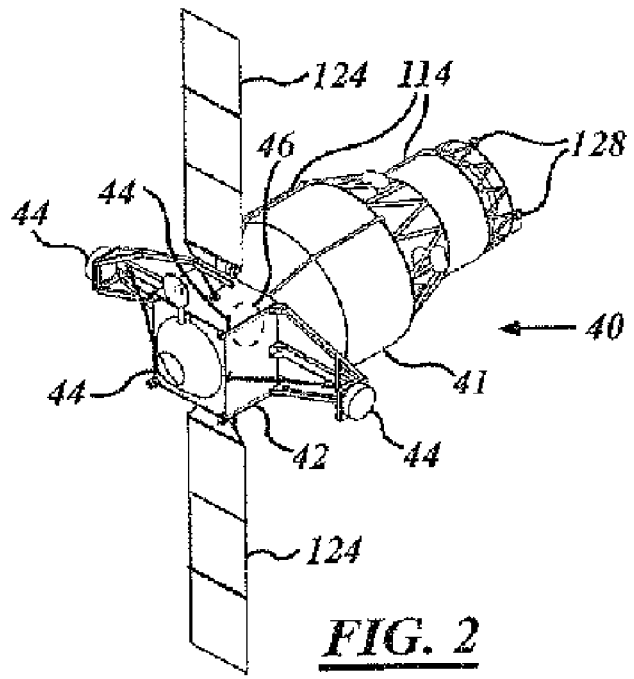
FIG. 2 is a perspective view of an unmanned orbital propellant depot in accordance with an embodiment of the present description.
Figure 3:
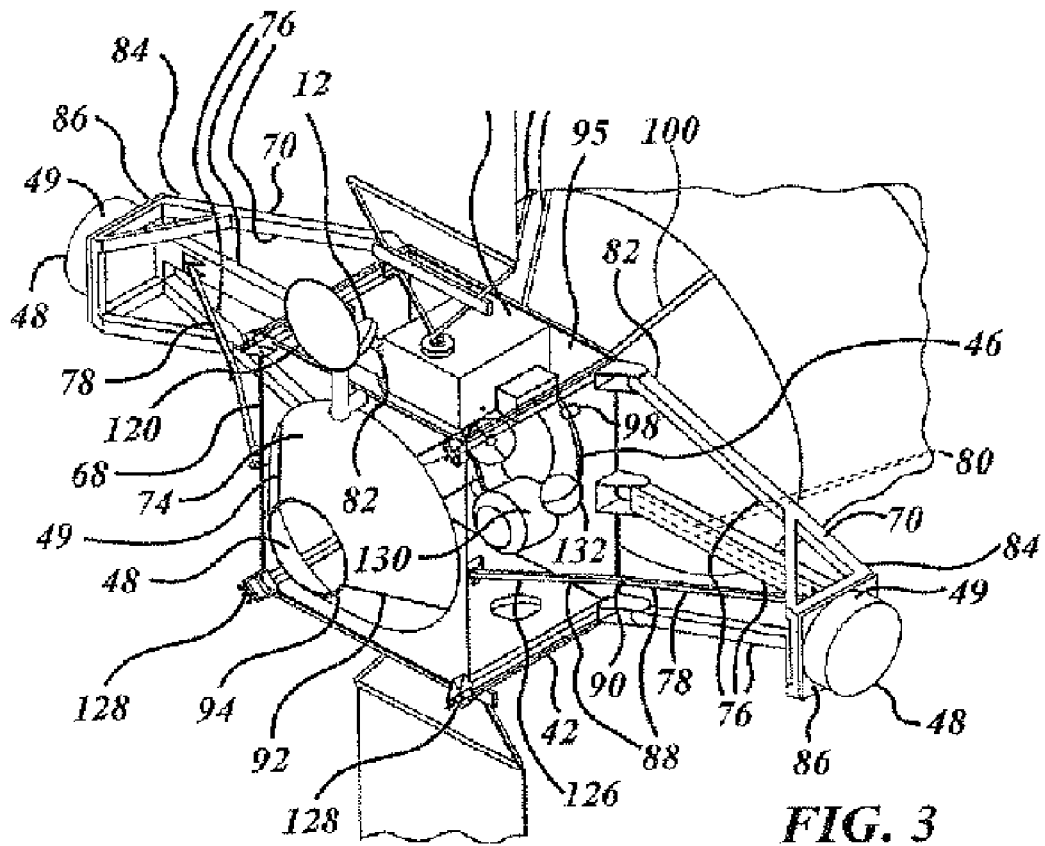
FIG. 3 is a close-up perspective view of a utility box of the unmanned orbital propellant depot of FIG. 2.
Figure 4:
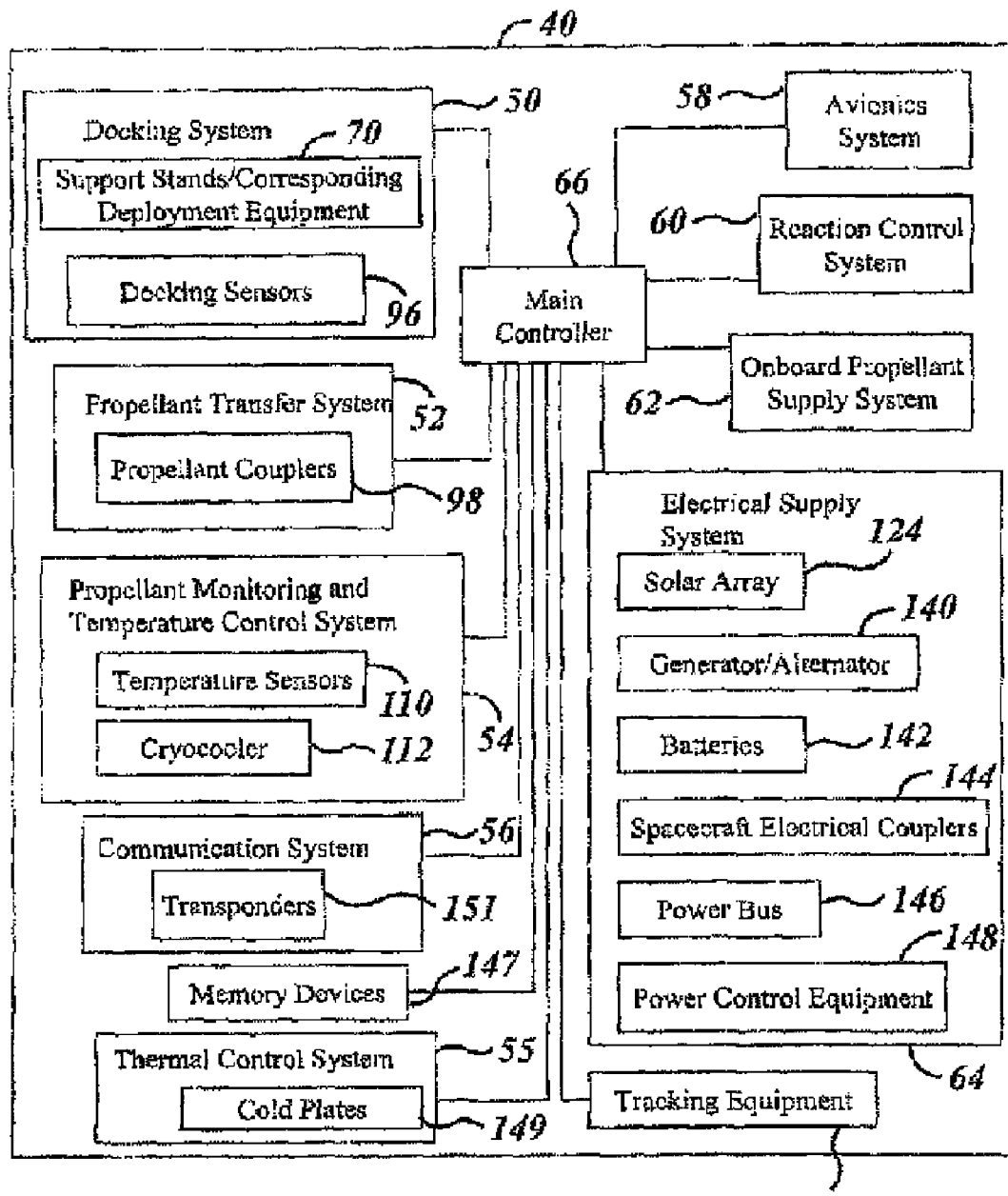
FIG. 4 is a block-diagrammatic view of the orbital propellant depot of FIG. 2.

Referring now to FIGS. 2-4, block diagrammatic and perspective views of an unmanned orbital propellant depot 40, consisting of a utility box 42 with an exchangeable propellant cartridge system 41 attached thereto in accordance with an embodiment of the present description, are shown. The utility box 42 is a spacecraft in and of itself. The unmanned depot 40 contains various space flight equipment, some of which is shown in FIGS. 2-4. The utility box 42 includes multiple docking ports 44. As an example, the utility box 42 may include one or more propellant cartridge system docking ports 46 (only one is shown) and one or more spacecraft docking ports 48. The spacecraft docking ports have associated spacecraft couplers 49. The spacecraft couplers 49 may be designated as standby (passive) docking couplers or active docking couplers depending upon whether the associated spacecraft is actively receiving propellant.

The unmanned propellant depot 40 also includes multiple operating systems including: a docking system 50, a propellant transfer system 52, a propellant monitoring and temperature control system 54, a thermal control system 55, a communication system 56, an avionics system 58, a reaction control system 60, an onboard propellant supply system 62, an electrical supply system 64, and other systems known in the art that may be utilized during flight of a spacecraft. All of the stated systems may include their own designated controller and/or may share a common controller, such as the main controller 66.

The docking system 50 includes the utility box 42, which has a main body 68 and multiple docking port support stands 70. The main body 68, as shown and in general, is a housing that contains or has coupled thereto the various flight equipment. Although the support stands 70 are shown in tripod style, they may be of various types and styles. Each of the support stands 70 includes multiple support legs 76 and a deployment member 78. The support legs 76 may be in the form of trays and contain propellant lines 80 that extend to and from the cartridge system 41. The support legs 78 have a pivoting end 82 that is coupled to the main body 68 and a fixed end 84 that is coupled to docking platforms 86. The docking platforms 86 are coupled to spacecraft active/passive couplers 48. The deployment member 78 has a pair of arms 88 that fold at a center point 90. The deployment members 78 allow the support stands 70 to deploy away from and retract towards the main body 68. The support stands 70 may be deployed and retracted via one or more motors (not shown), linkages (not shown), and the controller 66. A conical shaped coupler 74 is also coupled to the main body 68 and includes a base 92 and a docking port 94. The base 92 is coupled directly to the main body 68.

The docking system 50 also includes the cartridge docking ports 46, which couple to the docking adaptor 95 of the cartridge system 41. The cartridge docking coupler 95 may also be active or passive. The cartridge docking ports 46 are coupled to the utility box 42 and provide an attachment for connecting to the cartridge system 41.

The docking system 50 may also include docking sensors 96. The docking sensors 96 may be used to assure that the cartridge system 41 and any spacecraft docked to the unmanned depot 40 are properly coupled to the utility box 42 prior to propellant transfer. The docking sensors 96 may be of various types and styles. The docking sensors 96 may be in the form of contact sensors, infrared sensors, resistive sensors, or other similar sensors known in the art.

The propellant transfer system 52 includes the controller 66 that controls the transfer of propellant from and within the cartridge system 41 to a spacecraft docked at one of the docking ports 48. Propellant couplers 98 within the cartridge docking ports 46 and the cartridge-docking adaptor 95 are coupled to cartridge propellant supply and return lines 100. Propellant transfers through the cartridge propellant lines 100, through the cartridge docking ports 46 and cartridge-docking adaptor 95, through the propellant lines 80, and through the spacecraft docking ports 48 to the docked spacecraft.

The propellant monitoring system 54 may be referred to as a cryogenic propellant thermal management system. The propellant monitoring system 54 includes temperature sensors 110, which may be located on the unmanned depot 40 and coupled to the propellant lines 80 or may be located directly on the propellant cartridge system 41. The controller 66 is coupled to the temperature sensors 110 and adjusts the temperature of the propellant within the cartridge system 41 using a cryocooler 112 and/or other cooling devices or systems. The supply and return lines 100 extend between the propellant tanks 114 on the cartridge system 41 and the cartridge docking adaptor 95, whereupon they are coupled to the cryocooler 112.

The thermal control system 55 provides the utility box 42 with the systems to control the temperatures of the subsystem hardware located within the utility box 42. The thermal control system 55 as embodied, may include coldplates 149, which may be located on the unmanned depot 40 and coupled to the communication system 56, the avionics system 58 and the electrical power supply system 64. The coldplates 149 of the thermal control system 55 are coupled to a heat rejection system as typically found and utilized in the art.

The communication system 56 includes the controller 66, a communication antenna 120, and other communication equipment known in the art. The communication antenna 120, in one example embodiment, is a high gain antenna. The communication system 56 may be in communication with the cartridge system 41, with a ground-based system 14, and or with other spacecraft.

The avionics system 58 and the reaction control system 60 may include the communication system 56 and any other avionic or flight operation systems and devices known in the art. The avionics system 58 and the reaction control system 60 may include equipment typically found on a spacecraft with regards to flight operations, navigation, communication, etc. The avionics system 58 and the reaction control system 60 may include sun tracking solar arrays 124, reaction wheels 126, and thrusters 128, as shown. The thrusters 128 are used for flight and orientation of the unmanned depot 40.

The onboard propellant supply system 62 includes the controller 66 and may include an onboard propellant/hydrazine tank 130, a helium tank 132, and other propellant related tanks known in the art. The helium tank 132 may be used to pressurize the hydrazine tank 130. The onboard propellant supply system 62 provides propellant for flight by the unmanned depot 40. The onboard propellant supply system 62 supplies propellant to the thrusters 128, which are controlled by the avionics system 58 and the controller 66. The propellant tanks are pressurized and thus propellant contained therein is transferred through the use of valves (not shown).

The electrical supply system 64 includes the controller 66, a generator/alternator 140, batteries 142, solar arrays 124 and various electrical connections, lines, and couplers between the utility box 42 and any docked spacecraft, designated as spacecraft electrical couplers 144. Upon docking of a spacecraft to the unmanned depot 40, electrical connections are made between the spacecraft and the electrical supply system 64. Electrical connectors, such as a portion of the electrical couplers 144, within the docking couplers 49 are attached to the spacecraft. Electrical power is supplied from a power bus 146 that is coupled to the generator/alternator 140 and/or the batteries 142 to the spacecraft. The controller 66 monitors and adjusts the supply of electrical power. Electrical supply lines (not shown) may be extended through the legs 76, similar to the propellant lines 80.

The main controller 66 may be microprocessor based such as a computer having a central processing unit, memory (RAM and/or ROM), and associated input and output buses. The main controller 66 may be an application-specific integrated circuit or may be formed of other logic devices known in the art. The main controller 66 may be a portion of a central vehicle main control unit, an interactive vehicle dynamics module, a control circuit having a power supply, combined into a single integrated controller, or may be a stand-alone controller as shown.

The utility box 42 and the above-identified systems contained therein may include additional housings (not shown) for other standard bus box sub systems that are normally found on a spacecraft. The utility box 42 may include memory or data storage devices 147, power control boxes and equipment 148, cold plates 149, transponders 151, various tracking equipment 153, and other flight equipment, some of which may be part of one or more of the above-stated systems, as shown. The utility box 42 includes standard satellite bus functions, such as communication, power generation and distribution, and command and data handling.

Note that the utility box 42 operates independently of the cartridge system 41. The utility box 42 is capable of operating, performing flight tasks, and performing other spacecraft tasks separately from the cartridge system 41. This allows for change out or replacement of the cartridge system 41 without the use of additional devices.

Figure 5:
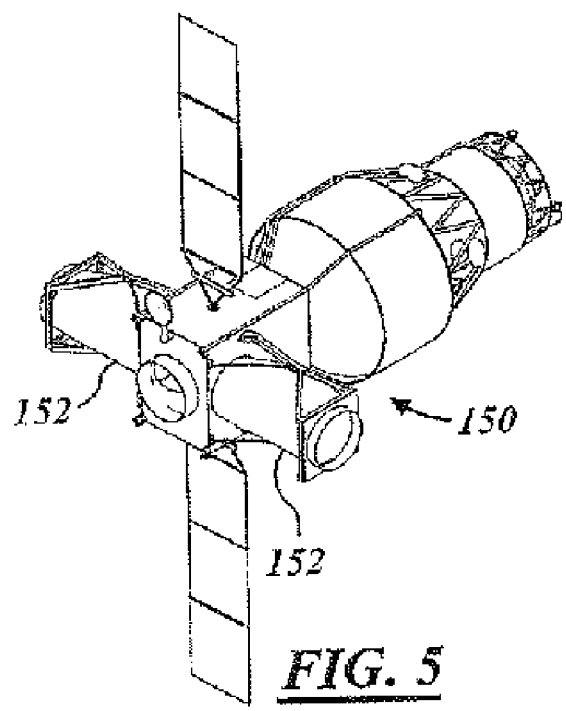
FIG. 5 is a perspective view of an orbital propellant depot that is capable of being manned in accordance with another embodiment of the present description.
Figure 6:
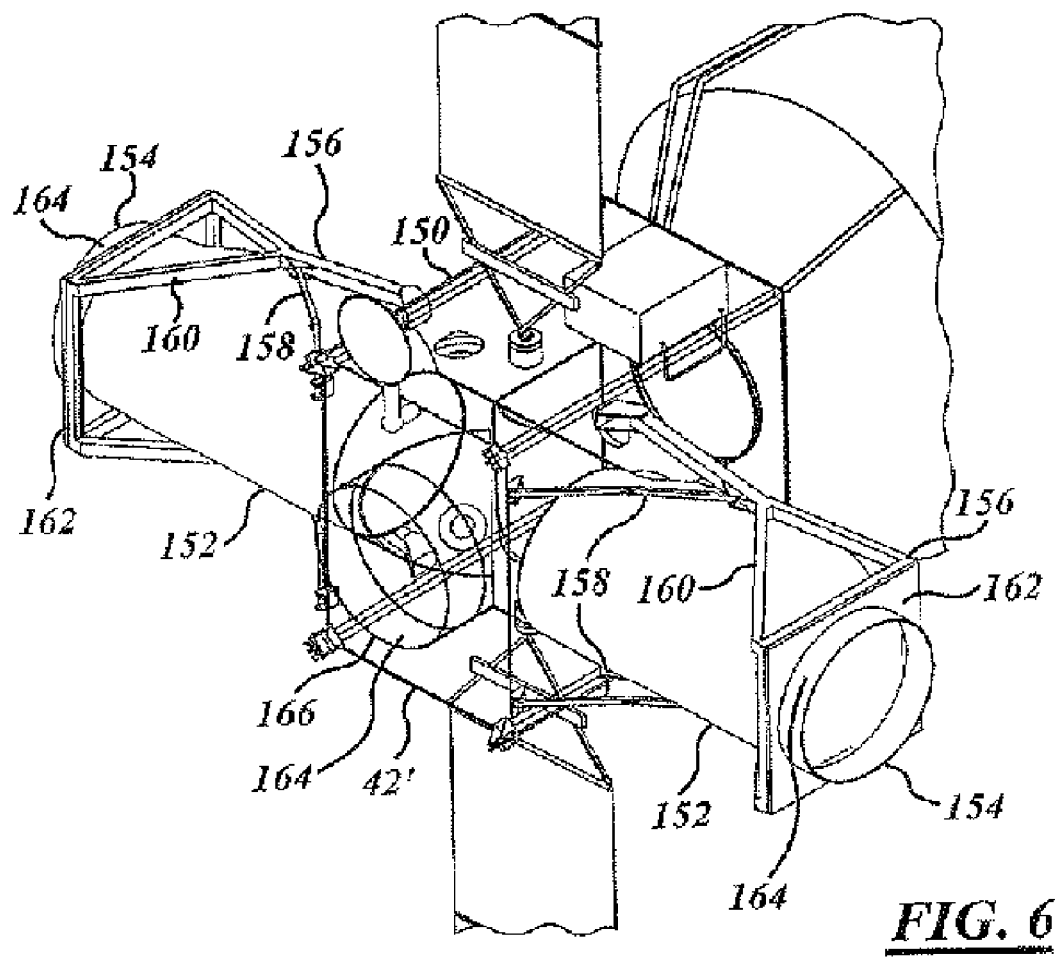
FIG. 6 is a close-up perspective view of a utility box of the orbital propellant depot of FIG. 5.

Referring now to FIGS. 5 and 6, perspective views of an orbital propellant depot 150 that is capable of being manned in accordance with another embodiment of the present description is shown. The propellant depot 150 is similar to the propellant depot 40, but is modified for manned operation and caring capability. The propellant depot 150 may be configured for both unmanned and manned operation. The propellant depot 150 includes the above-stated flight equipment and devices of the propellant depot 40, as well as man rated transfer tunnels 152 and other life support systems and equipment. The tunnels 152 provide safe transfer and passage of crewmembers between a docked spacecraft and a utility box 42' of the propellant depot 150. The tunnels 152 may be pressurized or unpressurized.

Although a pair of man rated transfer tunnels are shown, any number of tunnels may be utilized. The tunnels 152 span between a pair of docking ports 154 and the utility box 42'. The tunnels 152 are held in place by support stands 156. The tunnels 152 and the support stands 156 may be collapsible. The tunnels 152 may be formed of a flexible material, be formed of telescoping sections, or have an "accordion-like" structure to allow for the collapsing or retracting thereof. The support stands 156 may have dual folding members 158, as shown, or have other structure to allow for the collapsing or retracting thereof. The tunnels 152 and support stands 156 may have various configurations, only a few of which are described herein and illustrated in FIGS. 5 and 6. The support stands 156, as shown, have a pair of main 'Y'-shaped support members 160 that are coupled to docking port platforms 162. Docking port couplers 164 reside on the platforms 162 and are coupled to the tunnels 152 therethrough.

The propellant depot 150 may also include life support systems, such as oxygen tanks, breathing apparatuses, cavity pressure adjustment devices, lavatories, and food and beverage supplies and storage centers, which are not shown for simplicity, and other life support systems commonly found on a man rated spacecraft. The utility box 42' may have crew sitting/waiting areas, crew rest areas, or other accommodations, all of which are not shown, but may be envisioned by one skilled in the art.

The utility box 42' shown has a cylindrical style-docking adaptor 166, as opposed to the conical shaped docking adaptor 74. As stated above, the utility boxes may have various style docking adaptors. The cylindrical style-docking adaptor 166 may lend itself better for manned operation and crew transfer.

Figure 7:
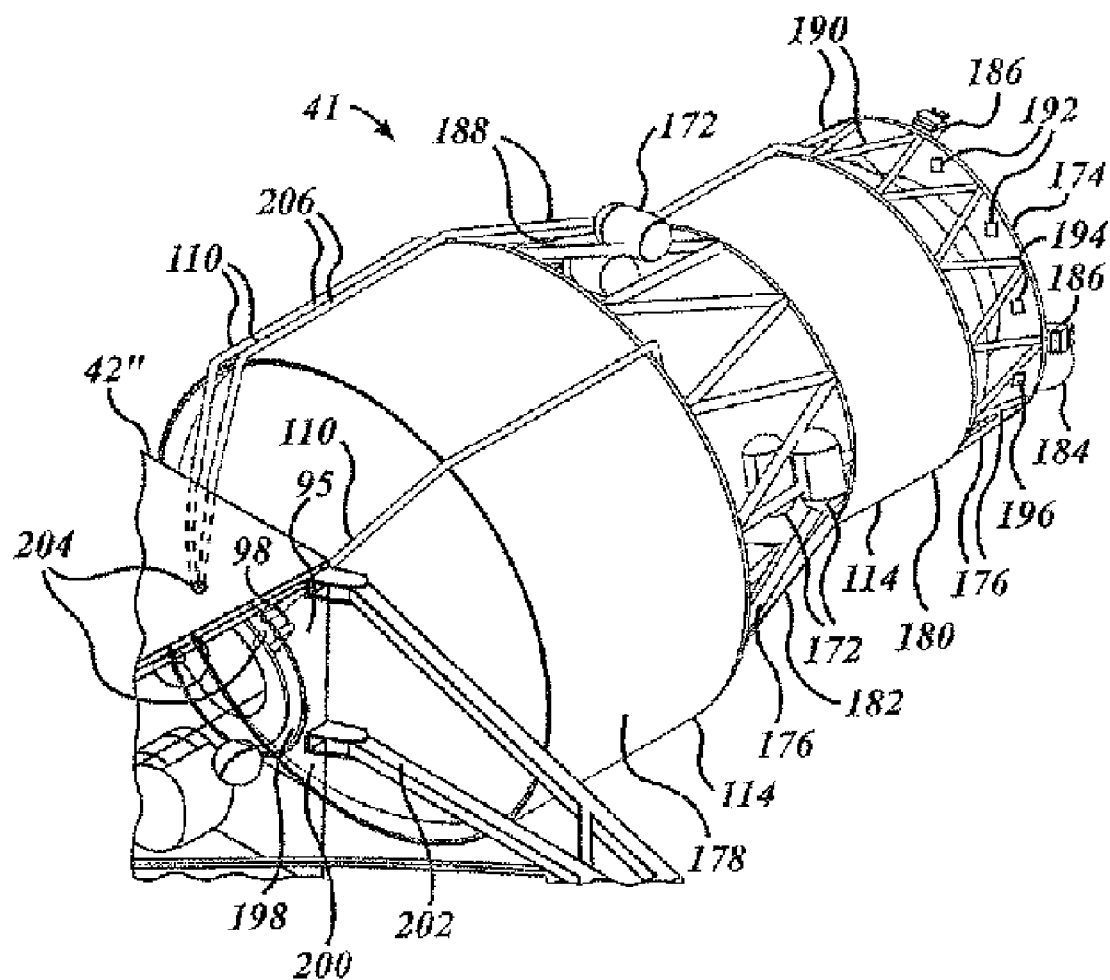
FIG. 7 is a close-up perspective view of a propellant tank cartridge system in accordance with an embodiment of the present description.

Referring now to FIG. 7, a close-up perspective view of the propellant tank cartridge system 41 in accordance with an embodiment of the present description is shown. The cartridge system 41 includes the propellant tanks 114, pressurant tanks or bottles 172, and an avionics support system or shelf 174. The propellant tanks 114, the bottles 172, and the avionics shelf 174 are separated by cross-support members 176 that extend therebetween. The propellant tanks 114 include a main cryogenic fuel tank 178 and an oxidizer tank 180 that are coupled to each other via an interstage 182 having a portion of the cross-support members 176. The cartridge system 41 is also a spacecraft in and of itself and is self-supportive. The avionics shelf 174 includes flight equipment necessary for flight operation and docking to a utility box, such as one of the utility boxes 42 or 42'.

The hydrazine tank 184 contains propellant for cartridge system 41 flight, as opposed to the main fuel tank 178 and the main oxidizer tank 180, which are storage tanks containing propellant that is transferred to spacecraft through a utility box of a propellant depot. Propellant within the hydrazine tank 184 is supplied to thrusters 186 of the cartridge system 41. The thrusters 186 may receive propellant directly from the main fuel tank 178 and the main oxidizer tank 180, thereby eliminating the need for the hydrazine tank 184. The thrusters 186 are used for in space flight maneuvering of the cartridge system 41.

The bottles 172 may contain pressurized helium, which is used to pressurize the propellant tanks 114. The bottles 172, as shown, are coupled to a first set of cross-members 188 extending between the main tank 178 and the oxidizer tank 180.

The avionics shelf 174 is coupled to the oxidizer tank 180 via a second set of cross-members 190. The avionics shelf 174 includes communication devices 192 for communication with a propellant depot and a ground-based station. The avionics shelf 174 may also include navigation control software and hardware 194 for flight operation, as well as disposal electronics 196 for disposal of the cartridge system 41. The cartridge system 41 may be remotely guided by a propellant depot or a ground-based station.

The cartridge system 41 also includes the orbital propellant depot docking adaptor 95 coupled to the main fuel tank 178. The docking adaptor 95 has a cylindrically shaped portion 198 and a conical shaped portion 200 and is attached to a leading end 202 of the main tank 178. The adaptor 95 includes propellant line couplings 204 for connecting the propellant lines 110 on the cartridge system 41 with propellant lines 110 on a utility box 42". Oxidizer feed and return lines 206 and propellant tank feed and return lines 208 for the cartridge system 41 are shown. The adaptor 95 also includes coupling sensors, such as the sensors 98, mentioned above.

Figure 8:
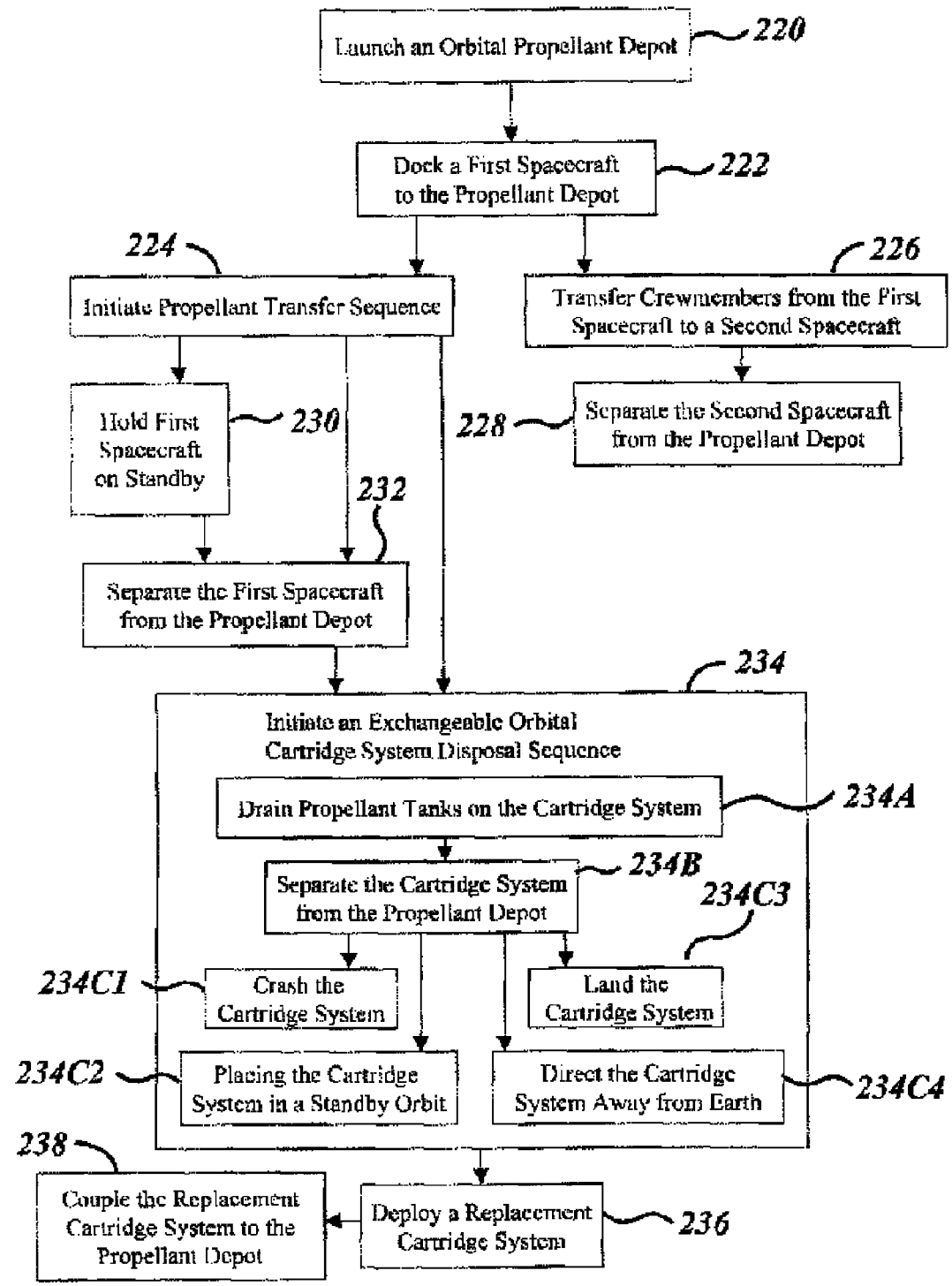
FIG. 8 is a logic flow diagram illustrating a method of providing propellant to a spacecraft in space in accordance with an embodiment of the present description.

Referring now to FIG. 8, a logic flow diagram illustrating a method of providing propellant to a spacecraft in space in accordance with an embodiment of the present description is shown.

In step 220, an orbital propellant depot, such as one of the propellant depots 40 or 150, is launched into space. The propellant depot may be launched using conventional methods of launching a spacecraft into space. The propellant depot may have associated rockets and propellant tanks for such launch or may be carried on a vehicle that has such equipment necessary to reach earth orbit flight or beyond. The propellant depot may be launched with an initial exchangeable propellant cartridge system, such as the cartridge system 41, attached thereto.

In step 222, a first spacecraft is docked to the propellant depot in space. The first spacecraft may be a surface activity module, a crew exploration vehicle, or other spacecraft. Once the first spacecraft is in range of the propellant depot, the first spacecraft may be guided to mate with the propellant depot via the avionics onboard the propellant depot and/or the avionics onboard the first spacecraft. As an example, the first spacecraft may have tracking equipment or sensors, such as the tracking equipment 153, for tracking and detecting targets on the propellant depot or vice versa. The sensors may include a laser range finder, an infrared camera, a visible spectrum camera, or other target tracking sensors. The targets may be of various types and styles and may include existing hardware or structure of the first spacecraft or the propellant depot. The first spacecraft is coupled to one of the docking ports of the propellant depot, such as one of the ports 44, 154, or 166. Propellant transfer lines and electrical lines may be connected upon coupling of the first spacecraft to the propellant depot.

In step 224, the propellant transfer sequence is initiated for the transfer of propellant from the propellant cartridge, such as cartridge 41, through the utility box 42 or 42' of the propellant depot to the first spacecraft.

In step 226, when the propellant depot is capable of transferring crewmembers, such as the propellant depot 150, the crewmembers of the first spacecraft may be transferred over to a second spacecraft through the utility box, such as utility box 42'. The second spacecraft may have been launched with the propellant depot or may have been previously docked and supplied propellant by the propellant depot.

In step 228, the second spacecraft may be separated from the propellant depot to perform assigned mission tasks.

In step 230, upon completion of supplying propellant to the first spacecraft, the first spacecraft may be held on standby until an assigned crew arrives or other mission parameters are met. In step 232, upon completion of the propellant resupply of the first spacecraft, the first spacecraft may, when having unmanned flight capability or when an assigned crew has arrived, be separated from the propellant spacecraft to perform assigned mission tasks.

In step 234, when propellant within the cartridge system is depleted or below a predetermined level, the cartridge system disposal sequence is initiated. In step 234A, when the propellant tanks within the cartridge system are not fully depleted of propellant, they may be drained prior to disposal of the cartridge system. In step 234B, the cartridge system is separated from the propellant depot and is removed from the orbit in which the propellant depot is within.

In step 234C1, the cartridge system is crashed into a planetary surface, a moon surface, or other celestial surface or body. In step 234C3, the cartridge system is landed on a celestial body. For example, the cartridge system may be directed towards earth and when at an appropriate altitude may deploy parachutes to decelerate its descent. In step 234C2, the cartridge system is directed into a standby or resting orbit. The standby orbit is different from the orbit of the propellant depot. The cartridge system may remain in the standby orbit indefinitely. In step 234C4, the cartridge system is directed farther into space away from earth. Of course, other techniques not discussed herein may be used to dispose of the cartridge system.

In step 236, a replacement exchangeable propellant cartridge system is deployed. The replacement cartridge system is launched into space to mate with the utility box. The replacement cartridge system may also have associated launch rockets and propellant tank or other launch equipment needed for placing the replacement cartridge system in orbit. The replacement cartridge system is directed to an area nearby the utility box, such as an area surrounding the L1 node. Once in orbit, the thrusters of the replacement cartridge system may be used to maneuver the replacement cartridge system to mate with the utility box. The utility box of the propellant depot may alone be used to guide in the replacement cartridge system via communication between avionics or controllers located on the utility box and the replacement cartridge system.

The replacement cartridge system may be guided to mate with the utility box using the avionics located onboard the replacement cartridge system, avionics onboard the utility box, and/or via commands generated from the ground-based station. The replacement cartridge system may also have sensors for detecting targets on the utility box or vice versa. The sensors may also include a laser range finder, an infrared camera, a visible spectrum camera, or other target tracking sensors. The targets may be of various types and styles and may include existing hardware or structure of the replacement cartridge system or the utility box.

In step 238, the replacement cartridge system is coupled to the utility box via a propellant depot adaptor, such as adaptors 46 and 95.

The above-described steps are also meant to be illustrative examples; the steps may be performed sequentially, synchronously, simultaneously, or in a different order depending upon the application.

The present description provides an orbital propellant resupply base that may remain at, for example, the L1 node for an unlimited period of time. The propellant resupply base allows for in space replacement of propellant through the use of exchangeable and disposable propellant cartridges. As such, the propellant resupply base operating costs are minimized.

While the apparatuses and methods enumerated herein have been described in connection with one or more embodiments, it is to be understood that the specific mechanisms and techniques which have been described are merely illustrative of the principles of this description, numerous modifications may be made to the methods and apparatus described without departing from the spirit and scope of the description as defined by the appended claims.

The invention claimed is:

1. An exchangeable propellant cartridge system, comprising:
   a cylindrical main fuel tank having a docking end and an internal end;
   a conical docking adaptor coupled to said docking end of said main fuel tank;
   a first interstage having a plurality of cross-support members arranged in a cone shape and pressurant bottles, said first interstage coupled to said internal end of said main fuel tank;
   a cylindrical oxidizer tank having a main fuel tank end and an avionics shelf end, wherein said main fuel tank end is coupled to said first interstage;
   a second interstage having a plurality of cross-members arranged in a cylinder shape, said second interstage being coupled to said avionics shelf end of said oxidizer tank; and
   an avionics platform coupled to said second interstage, said avionics platform comprising an avionics support system;
   said main fuel tank having a diameter larger than the diameter of said oxidizer tank; and
   said main fuel tank being positioned coaxially with said oxidizer tank.

2. The exchangeable propellant cartridge system of claim 1, wherein:
   said pressurant bottles contain pressurized helium.

3. The exchangeable propellant cartridge system of claim 1, further comprising propellant lines coupled to the main fuel tank.

4. The exchangeable propellant cartridge system of claim 3, wherein:
   said conical docking adaptor has a conical section and a cylindrical section;
   said conical section has propellant line couplings attached to the propellant lines.

5. A cartridge system as in claim 1 wherein said avionic support system comprises disposal electronics.

6. A cartridge system as in claim 5 wherein said disposal electronics disposes of the cartridge system when propellant within any of the main fuel tank, or the oxidizer tank is below a predetermined level.

7. A cartridge system as in claim 6 wherein said disposal electronics in disposing of the cartridge system performs a task selected from at least one of crashing the cartridge system and de-orbiting the cartridge system from an orbit in which the orbital propellant depot exists.

8. A cartridge system as in claim 1 further comprising a communication system coupled to said avionics support system.

9. A cartridge system as in claim 8 wherein said communication system comprises orbital propellant depot communication capable electronics.

10. A cartridge system as in claim 8 wherein said communication system comprises ground communication capable electronics.

11. A cartridge system as in claim 1 further comprising:
a cooling system coupled to either of said main fuel tank or said oxidizer tank;
a temperature sensor generating a temperature signal indicative of the temperature of a propellant in either of said main fuel tank or said oxidizer tank; and
a controller coupled to said cooling system and said temperature sensor and adjusting temperature of said propellant in response to said temperature signal.

* * * * *